(12) United States Patent
Tamezane et al.

(10) Patent No.: US 8,756,962 B2
(45) Date of Patent: Jun. 24, 2014

(54) KEY INTERLOCK DEVICE

(75) Inventors: Takumi Tamezane, Aichi (JP); Hiroshi Yoshida, Aichi (JP); Daisuke Nomichi, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 139 days.

(21) Appl. No.: 13/152,517

(22) Filed: Jun. 3, 2011

(65) Prior Publication Data

US 2011/0296881 A1 Dec. 8, 2011

(30) Foreign Application Priority Data

Jun. 8, 2010 (JP) ................................. 2010-131109

(51) Int. Cl.
*F16C 3/00* (2006.01)

(52) U.S. Cl.
USPC .............................................. 70/186; 70/252

(58) Field of Classification Search
USPC ........... 70/181, 182, 183, 184, 185, 186, 187, 70/252
See application file for complete search history.

(56) References Cited

U.S. PATENT DOCUMENTS

| | | | | | |
|---|---|---|---|---|---|
| 3,596,483 | A | * | 8/1971 | Elliott ............................... | 70/156 |
| 3,613,412 | A | * | 10/1971 | Kenichi .......................... | 70/232 |
| 3,919,867 | A | * | 11/1975 | Lipschutz et al. ............. | 70/186 |
| 4,031,728 | A | * | 6/1977 | Eichenauer ...................... | 70/252 |
| 4,318,288 | A | * | 3/1982 | Rifat ............................... | 70/252 |
| 4,414,830 | A | * | 11/1983 | Maiocco ......................... | 70/252 |
| 4,487,042 | A | * | 12/1984 | Mochida et al. ................. | 70/186 |
| 4,576,024 | A | * | 3/1986 | Weber ............................. | 70/252 |
| 4,759,203 | A | * | 7/1988 | Lieb et al. ....................... | 70/185 |
| 4,945,740 | A | * | 8/1990 | Kawano et al. ................. | 70/248 |
| 5,065,604 | A | * | 11/1991 | Pattock .......................... | 70/239 |
| 5,117,664 | A | * | 6/1992 | Kurozu et al. ................... | 70/252 |
| 5,121,616 | A | * | 6/1992 | Rind ............................... | 70/186 |
| 5,271,252 | A | * | 12/1993 | Yasuhara et al. ................ | 70/186 |

(Continued)

FOREIGN PATENT DOCUMENTS

| | | |
|---|---|---|
| DE | 10101983 | 7/2002 |
| EP | 2213530 | 8/2010 |

(Continued)

OTHER PUBLICATIONS

Extended European Patent Search Report Application No. 11168608.5 mailed Jun. 5, 2013.

(Continued)

*Primary Examiner* — Peter M Cuomo
*Assistant Examiner* — Duoni Pan
(74) *Attorney, Agent, or Firm* — Roberts Mlotkowski Safran & Cole, P.C.

(57) ABSTRACT

A key interlock device includes a solenoid that holds a plunger when the solenoid is excited, and a link member that includes a shaft around which the link member is rotatable, and engages with the plunger so as to transmit a restraining force opposing an operation force of a key when the solenoid is excited. The shaft of the link member is disposed on a virtual line extending from a line of force of the operation force of the key. The key interlock device may include an engaging part through which the key interlock device is attached to a body of a steering lock device and which is disposed behind the shaft to which the operation force of the key applies.

11 Claims, 6 Drawing Sheets

(56) References Cited

U.S. PATENT DOCUMENTS

| | | | |
|---|---|---|---|
| 5,685,183 A | 11/1997 | Hattori | |
| 5,689,983 A * | 11/1997 | McCoolidge | 70/252 |
| 5,794,469 A * | 8/1998 | Suzuki | 70/252 |
| 6,354,117 B1 * | 3/2002 | Canard | 70/186 |
| 6,427,503 B2 * | 8/2002 | Kataumi et al. | 70/247 |
| 6,751,991 B2 * | 6/2004 | Tamukai | 70/186 |
| 6,881,173 B2 * | 4/2005 | Harada et al. | 477/99 |
| 7,302,817 B2 * | 12/2007 | Ohtaki et al. | 70/186 |
| 7,435,919 B2 * | 10/2008 | Hidaka | 200/43.08 |
| 2003/0079509 A1 * | 5/2003 | Ochi | 70/186 |
| 2004/0003632 A1 * | 1/2004 | Ohtaki et al. | 70/252 |
| 2006/0169010 A1 * | 8/2006 | Limburg | 70/186 |

FOREIGN PATENT DOCUMENTS

| | | |
|---|---|---|
| EP | 2213531 | 8/2010 |
| JP | 07-329718 A | 12/1995 |
| JP | A-2000-229557 | 8/2000 |
| JP | 2001-301571 A | 10/2001 |

OTHER PUBLICATIONS

Japanese Patent Application No. 2010-131109, Japanese Office Action Dated Sep. 3, 2013, Partial English Translation Attached.

* cited by examiner

KEY INTERLOCK DEVICE

The present application is based on Japanese patent application No. 2010-131109 filed on Jun. 8, 2010, the entire contents of which are incorporated herein by reference.

BACKGROUND OF THE INVENTION

1. Field of the Invention

This invention relates to a key interlock device that is attached to a steering lock device for a vehicle.

2. Description of the Related Art

Steering lock devices have been popularized that are equipped with a key interlock device to restrain a steering key (i.e., ignition key) from being turned form an "ACC" position to "LOCK" position when the vehicle is driven. The key interlock device uses an attraction type solenoid that is operable to attract a plunger when it is excited (e.g., JP-A-2000-229557).

The attraction type solenoid operates to attract the plunger when a drive current is fed (i.e., the solenoid is excited or energized), so that a problem arises that the power consumption increases. Therefore, in recent years, the key interlock device is desired to use a retention type solenoid that can relatively save the power consumption.

SUMMARY OF THE INVENTION

Although the retention type solenoid can hold the plunger at the excited state, it cannot have the plunger actively operate. Thus, when the retention type solenoid is used for the key interlock device, a lock mechanism needs to be constructed adding a new reinforcement member such as a link. Therefore, it is necessary to prevent an increase in the manufacturing cost due to increased parts, complicated installation process and the like.

Accordingly, it is an object of the invention to provide a key interlock device that can prevent an increase in the manufacturing cost when the retention type solenoid is used.

(1) According to one embodiment of the invention, a key interlock device comprises:

a solenoid that holds a plunger when the solenoid is excited; and a link member that comprises a shaft around which the link member is rotatable, and engages with the plunger so as to transmit a restraining force opposing an operation force of a key when the solenoid is excited, wherein the shaft of the link member is disposed on a virtual line extending from a line of force of the operation force of the key.

In the above embodiment (1) of the invention, the following modifications and changes can be made.

(i) The link member further comprises a linear arm part along the line of force of the operation force of the key.

(ii) The link member further comprises a resin.

(2) According to another embodiment of the invention, a key interlock device comprises:

a solenoid that holds a plunger when the solenoid is excited; and a link member that comprises a shaft around which the link member is rotatable and engages with the plunger so as to transmit a restraining force opposing an operation force of a key when the solenoid is excited, wherein the shaft of the link member is disposed on a virtual line extending from a line of force of the operation force of the key, and wherein the key interlock device further comprises an engaging part through which the key interlock device is attached to a body of a steering lock device and which is disposed behind the shaft to which the operation force of the key applies.

In the above embodiment (2) of the invention, the following modifications and changes can be made.

(iii) The link member further comprises a linear arm part along the line of force of the operation force of the key.

(iv) The link member further comprises a resin.

(v) The engaging part is disposed at one end of the key interlock device and is adapted to be inserted into an opening of the body of the steering lock device, and the key interlock device is fixed to the body at an other end thereof.

(vi) The engaging part is disposed at one end of the key interlock device in a direction of turning back the key from an ACC position to a LOCK position thereof.

(vii) The arm part comprises a pressure receiving surface at an end, and the pressure receiving surface contacts an action surface to which the operation force of the key applies.

(viii) The pressure receiving surface contacts the action surface to restrain the key from being turned back from an ACC position to a LOCK position thereof when the solenoid is excited.

Points of the Invention

According to one embodiment of the invention, a key interlock device (or interlock unit) is constructed such that a rotation shaft part for rotatably supporting a link and a pin penetrating through the rotation shaft part are disposed on a virtual line extending from a line of force of a rotation force generated in the tangential direction of a cam shaft operated by a key (regular or authentic key). Since the rotation force from the cam shaft is received at the rotation shaft part and the pin, the burden of a load to the link can be reduced. In addition, an arm part of the link is formed to extend linearly from the rotation shaft part as a center, so that only a compression load component acts on the arm part without a bending stress component. The link mechanism thus constructed is used as a reinforcement part of a retention solenoid, so that the link may be formed of a resin such as PBT having high resistance to a compression load instead of metals. Thus, the manufacturing cost of the key interlock device can be reduced.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

Figure 1A:
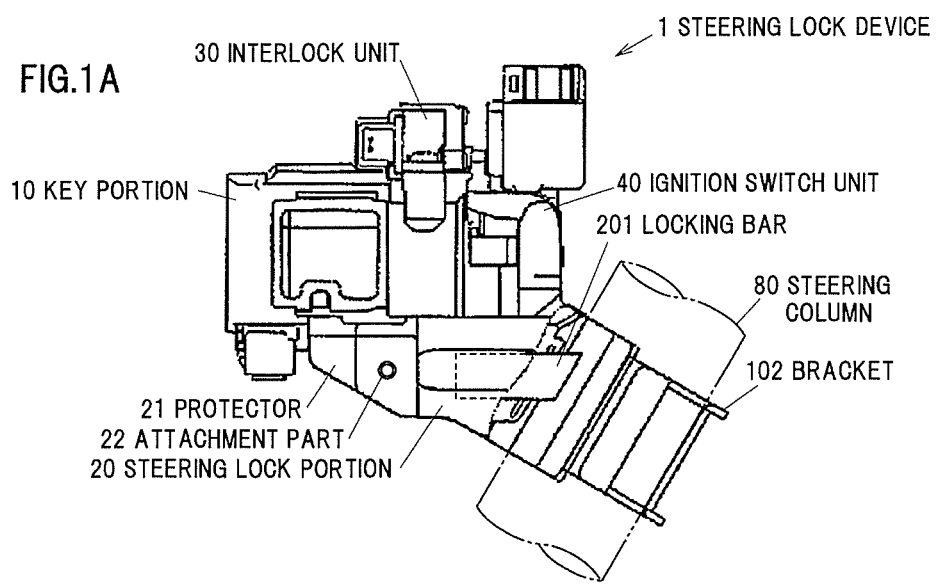
FIG. 1A is a side view schematically showing a steering lock device using a key interlock device according to one embodiment of the present invention, in which a part of a bracket for fixing a steering column thereof is shown in a partially broken state.
Figure 1B:
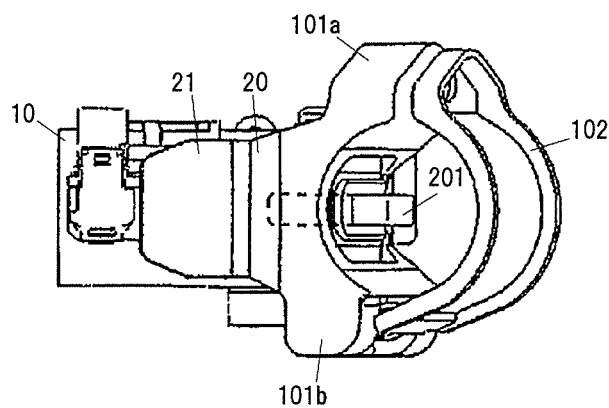
FIG. 1B is a bottom view schematically showing the steering lock device shown in FIG. 1A.

A preferred embodiment of the present invention will be detailed below with reference to drawings. First, a steering lock device 1 will be explained, that includes an interlock unit 30 as an interlock key device according to the present invention. Here, FIG. 1A is a side view schematically showing the steering lock device 1 using the interlock key device according to one embodiment of the present invention, in which a part of a bracket 102 for fixing a steering column 80 thereof is shown in a partially broken state. In addition, FIG. 1B is a bottom view schematically showing the steering lock device 1 shown in FIG. 1A. The steering lock device 1 is configured so as to include a key part 10, a steering lock part 20, the interlock unit 30 and an ignition switch unit 40.

Figure 2:
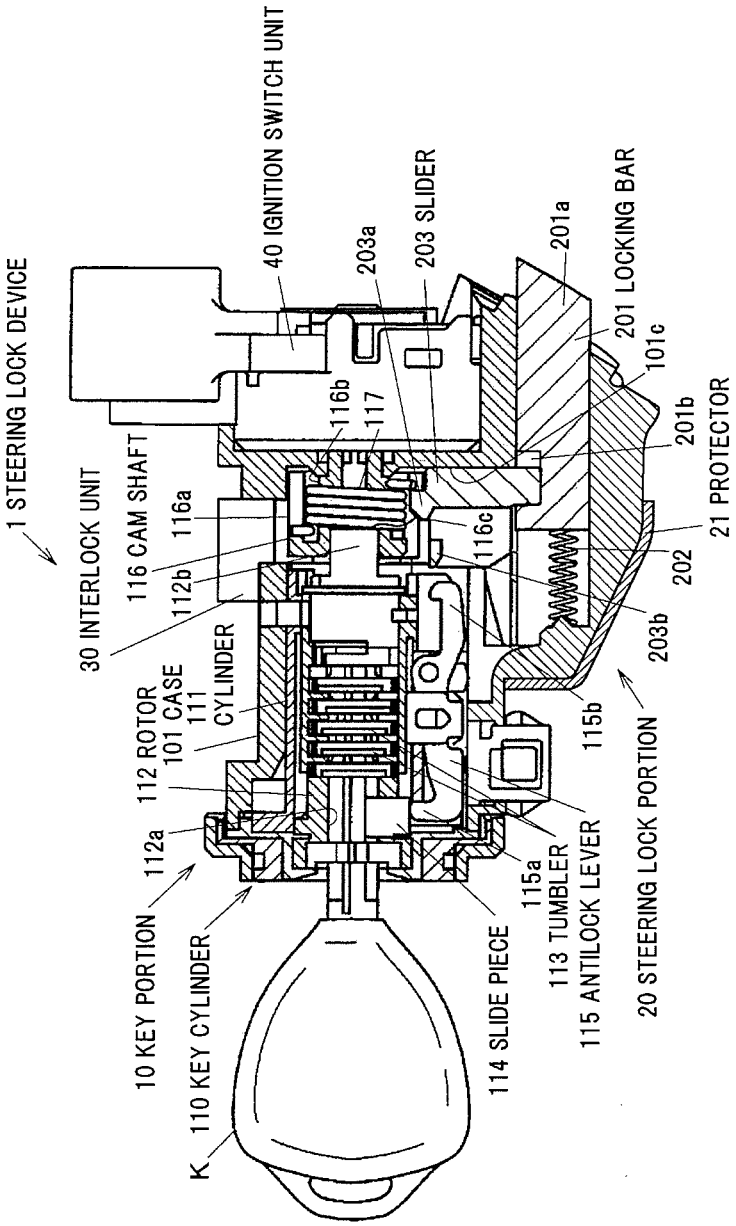
FIG. 2 is a longitudinal cross-sectional view schematically showing an inner structure of the steering lock device using the key interlock device according to one embodiment of the present invention.

FIG. 2 is a longitudinal cross-sectional view schematically showing an inner structure of the steering lock device 1. A case 101 of the steering lock device 1 is integrally formed of a metal such as zinc die-cast. A key cylinder 110 that has a cylinder 111 and a rotor rotatably housed in the cylinder 111 is mounted in the case 10 by insertion thereinto. A key hole 112a into which a key K is inserted is formed in the rotor 112 of the key cylinder 110 so as to extend toward the inside in the axis direction.

In addition, a plurality of tumblers 113, 113, . . . having an elongate shape in the diameter direction (vertical direction) of the rotor 112 are housed in the rotor 112 along the longitudinal direction thereof in a movable state. Each end portion of tumblers 113, 113, . . . projects from an outer periphery of the rotor 112 so as to engages with an inner periphery of the cylinder 111 in a state that the key K is not inserted therein, thereby the rotor 112 is restrained from being rotated. On the other hand, when a proper key K is inserted into the rotor 112, each tumbler 113, 113, . . . corresponding to an end surface of a mountain-groove shape of the key K engages with the end surface of the key K so that all of the tumblers 113, 113, . . . evacuate from the outer periphery of the rotor 112. Thereby, it becomes possible to carry out rotation operation of the rotor 112.

A slide piece 114 is mounted in the front lower side of the rotor 112 in the diameter direction in a movable state. The outer surface of the slide piece 114 is curved at the same curvature as that of the outer surface of the rotor 112, so that the rotor 112 and the slide piece 114 are configured to be integrally rotated in the key cylinder 110. In addition, in a state that the key K is inserted into the rotor 112, the slide piece 114 is restrained from moving in the center direction of the rotor 112 by that the end portion thereof is brought into contact with a part of the key K.

An antilock lever 115 that is an elongated movable member is mounted in the lower part of the key cylinder 110, parallel to the center axis of the key cylinder 110 and rotatably around a shaft of the central part thereof. A front end part 115a is formed in the front end of the antilock lever 115 so as to be bent toward the slide piece 114 located at the upper position, and a back end part 115b that is capable of engaging with an engaging projection 203b of a slider 203 described below is formed in the back end thereof. Further, elastic force acts on the antilock lever 115 in a direction (elevating direction) from the front end part 115a to the slide piece 114 by a spring or the like (not shown). In a state that the rotor 112 is located at the "LOCK" position or the key K is removed from the key cylinder 110, the elastic force acts on the antilock lever 115, thereby the front end part 115a elevates and simultaneously the back end part 115b descends so that the antilock state is released (steering lock allowing state).

A cam shaft 116 is formed so as to be combined with a rear shaft of the rotor 112. The cam shaft 116 includes an outer tubular part 116a having an approximately cylindrical shape and an inner tubular part 116b having an approximately cylindrical shape similarly so that both are integrally formed at the front part in combination with each other. The rear shaft 112b of the rotor 112 is fitted to an inner periphery of the inner tubular part 116b of the cam shaft 116, and simultaneously a rear end part of the inner tubular part 116b projects from the case 101 so as to be combined with the ignition switch unit 40. Thereby, the rotor 112 of the key cylinder 110 is operated to be rotated by the proper key K, so that the ignition switch unit 40 is operated via the cam shaft 116.

A torsion spring 117 is housed in a space between the outer tubular part 116a and the inner tubular part 116b of the cam shaft 116. One end of the torsion spring 117 engages with the outer tubular part 116a of the cam shaft 116, thus when the rotor 112 of the key cylinder 110 reaches an "ON" position by rotation operation of the key K, another end of the torsion spring 117 engages with the case 101, thereby a spring force acts on the cam shaft 116 in the direction in which operation of the key K is returned from a "START" position to the "ON" position.

A cam surface 116c is formed in a lower part of the outer tubular part 116a of the cam shaft 116, that slides in contact with a follower part 203a of a slider 203 described below.

The steering lock part 20 includes a lock bar 201, a compression spring 202 and the slider 203. The lock bar 201 is formed of high stiffness metal so as to have a rod-like shape, and the distal end part thereof is mounted in a lower part of the steering lock device 1 so as to be movable back and forth from the case 101 to a side of the steering column 80. In addition, a spring force always acts on the lock bar 201 in the direction in which it exits from the case 101 by the compression spring 202 housed in the case 101.

In the case 101, a groove part 201b is formed in an upper part of the lock bar 201, a lower part of the slider 203 is fitted to the groove part 201b. Together with this, a rear surface of upper part of the slider 203 is brought into contact with an inner wall 101c of rear part of the case 101, thereby the lock bar 201 is prevented from falling out of the case 101.

The follower part 203a is integrally formed in an upper part of the slider 203 so as to follow in contact with the cam surface 116c of the above-mentioned cam shaft 116. In addition, an engaging projection 203b capable of engaging with the rear end part 115b of the above-mentioned antilock lever 115 is formed in an upper part of the front portion of the slider 203.

Figure 3:
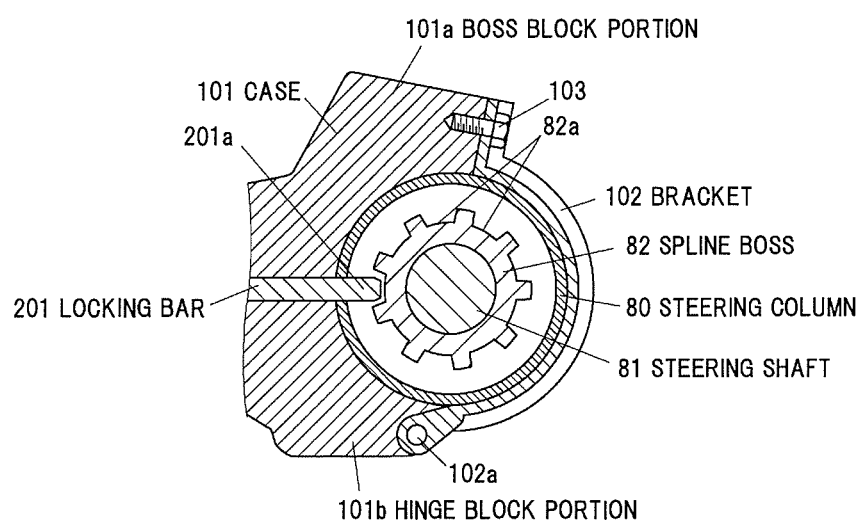
FIG. 3 is a cross-sectional view schematically showing parts of a lock bar and the steering column in the steering lock device using the key interlock device according to one embodiment of the present invention.

Here, FIG. 3 is a cross-sectional view schematically showing parts of the lock bar 201 and the steering column 80 in the steering lock device 1 shown in FIG. 1. A bracket 102 is formed so as to have a semicircular arc shape and one end is openable supported via a hinge shaft 102a in a hinge block part 101b of the case 101. The bracket 102 is opened, the steering column 80 is fixed to the case 101 and another end is fixed to a boss block part 101a via a bolt 103 in a state that the bracket 102 is closed, thereby the steering column 80 is mounted in the steering lock device 1.

As shown in FIG. 3, in a lock position in which the lock bar 201 advances toward a side of the steering column 80, the distal end part 201a of the lock bar 201 enters into a concave portion 82a of a spline boss 82 fitted to the steering shaft 81 so as to engage therewith, thereby, the steering shaft 81 is restrained from being rotated. In addition, in an unlock position in which the lock bar 201 evacuates, the distal end part 201a of the lock bar 201 and spline boss 82 does not engage with each other, the rotation restraint of the steering shaft 81 is released.

According to the above-mentioned configuration of the steering lock part 20, in a state that the key K is removed from the key hole 112a, the slide piece 114 is not restrained from moving, thereby slide piece 114 is elevated by the front end part 115a of the antilock lever 115, and simultaneously the back end part 115b of the antilock lever 115 descends. Consequently, the engaging projection 203b of the slider 203 and the back end part 115b of the antilock lever 115 can not engage with each other, thus the lock bar 201 advances toward the lock position by the elastic expansion force of the compression spring 202 and simultaneously the rear surface of upper part of the slider 203 fitting to the groove part 201b of the lock bar 201 is brought into contact with the inner wall of rear part of the case 101, thereby the lock bar 201 is maintained in the lock position.

In the course that the proper key K is inserted into the key hole 112a, and the rotor 112 is rotated from the "LOCK" position to the "ACC" position, the outer surface of the slide piece 114 moves to the position corresponding to the outer periphery of the rotor 112, thereby the front end part 115a of the antilock lever 115 is pushed downward, and simultaneously the rear end part 115b of the antilock lever 115 is elevated. At this time, the cam shaft 116 is rotated in conjunction with rotation of the rotor 112, thereby the slider 203 and the engaging projection 203b in the front part of the slider 203 move forward together with the follower part 203a that follows in contact with the cam surface 116c of the cam shaft 116, and further the lock bar 201 that fits to the slider 203 in the groove part 201b evacuates to the unlock position. In addition, when the rotor 112 operated to be rotated reaches the "ACC" position, the engaging projection 203b engages with the rear end part 115b of the antilock lever 115, thereby the slider 203 is held at the position, and simultaneously the lock bar 201 fitting to the slider 203 is held at the unlock position. Thereby, after the key K is operated to be rotated to the "ACC" position, the steering lock is made antilock so as to prevent the steering lock from malfunctioning.

Next, the interlock unit 30 as a key interlock device according to an embodiment of the present invention will be explained.

Figure 4:
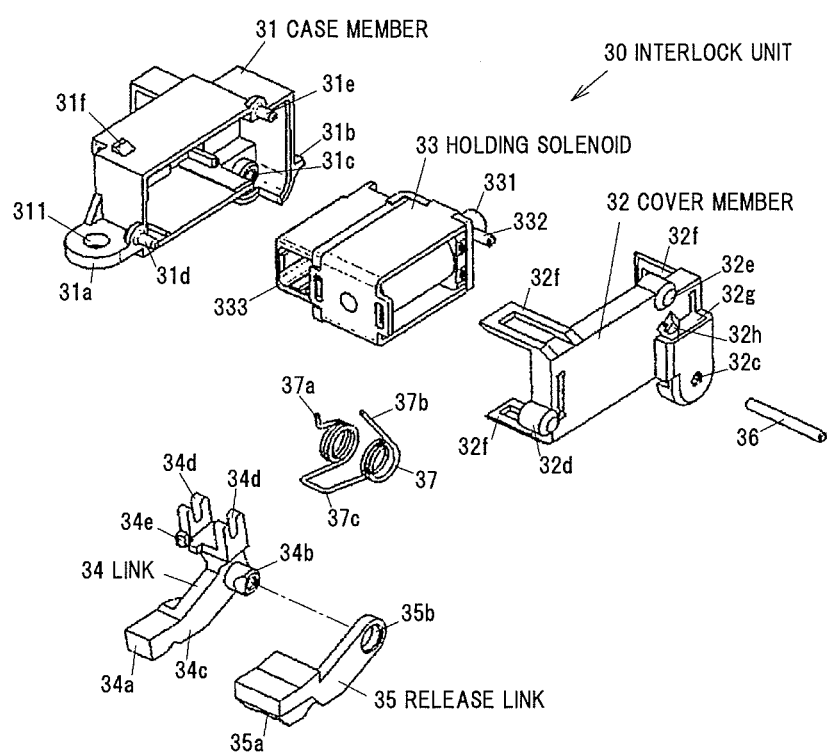
FIG. 4 is an exploded perspective view schematically showing an internal constitution of an interlock unit as the key interlock device according to one embodiment of the present invention.

FIG. 4 is an exploded perspective view schematically showing an internal constitution of the interlock unit 30 as the key interlock device according to an embodiment of the present invention. As shown FIG. 4, the interlock unit 30 includes a case member 31 and a cover member 32, and a holding solenoid 33, a link 34, a release link 35 and a torsion spring 37 that are housed in the case member 31 and the cover member 32.

The case member 31 is integrally formed of a resin material having good heat conductivity such as PBT containing glass fibers by an injection molding. The case member 31 has an outer shape of an approximate rectangle, and is formed so as to have a frame-like shape of which front and rear parts are mostly opened. When viewed in the insertion direction of the key K, at a bottom right part of the case member 31, a screw bracket part 31a having a hole 311 is formed to project, and at a bottom left part opposite to the screw bracket part 31a, an engaging projection part 31b is formed.

In addition, the inner part of the case member 31 in which the engaging projection part 31b is formed is partially opened downward, and simultaneously a bearing part 31c having a cylindrical shape is formed in the side wall part of the case member 31. In addition, in two sites of rear end part of the case member 31, fitting projection parts 31e, 31d having a pin-like shape are formed so as to project, and in a predetermined site of the outer wall part of the case member 31, a plurality of engaging claws 31f are formed.

The cover member 32 is formed of the same resin material as the case member 31 by an injection molding so as to have an approximately plate-like shape. The cover member 32 is a member mounted for blocking the open part in the rear side of the case member 31, in which fitting hole parts 32d, 32e that fit to the fitting projection parts 31e, 31d of the case member 31 are formed, and a plurality of engaging frame parts 32f that engage with the engaging claws 31f of the case member 31 are formed so as to project. In addition, in the lower part of the cover member 32 corresponding to the bearing part 31c of the case member 31, a pin pole 32c is formed so as to be opened. In addition, above the pin pole 32c of the cover member 32, an open part 32g is formed by that a step part is opened, and simultaneously in the opening end of the open part 32g, a spring engaging part 32h is formed so as to project.

The holding solenoid 33 includes a plunger 331 and an engaging shaft 332 perpendicular to the plunger 331. In addition, a harness connector 333 is mounted in the front part of the holding solenoid 33. The holding solenoid 33 becomes in an excited state by that the driving current is supplied, so that the holding solenoid 33 generates holding force (attraction force) restraining the plunger 331 from projecting.

The holding solenoid 33 is housed in the case member 31 so as to expose the harness connector 333 from the open part of front side of the case member 31 to the outside.

The link 34 is a reinforcement member integrally formed of a synthetic resin material such as PBT containing glass fibers similarly to the case member 31. The link 34 includes an arm part 34c of a linear shape having a pressure receiving surface 34a being flat-shaped in the right side when viewed from the insertion direction of the key K, a rotation shaft part 34b formed in the left basic end side of the arm part 34c, engaging groove parts 34d, 34d having a two-pronged portion bent at an approximately right angle at the position of the rotation shaft part 34b, and a spring engaging part 34e formed in the left front part of one of the engaging groove parts 34d so as to project.

The release link 35 is a member formed of a resin material having good sliding characteristics such as POM, and has a taper surface 35a having a downward-facing slope formed in the right side when viewed from the insertion direction of the key K. In addition, a bearing hole 35b into which the rotation shaft part 34b of the link 34 is inserted is formed in the end part opposite to the taper surface 35a so as to be opened. The release link 35 is supported by the rotation shaft part 34b of the link 34 at the bearing hole 35b, thereby it is rotatably mounted relatively to the link 34.

As shown in FIG. 4, the torsion spring 37 is formed so as to have such a configuration that two spiral parts having the same diameter and axis are combined with each other at a combining part 37c. The torsion spring 37 comes into contact with the release link 35 at the combining part 37c, and the two spiral parts are respectively fitted to both end parts of the rotation shaft part 34b of the link 34 so as to stride the link 34 and the release link 35. In addition, simultaneously one end 37a of the torsion spring 37 engages with the spring engaging part 34e of the link 34. Thereby, the link 34 and the release link 35 are prevented from being removed in the axis direction by being sandwiched between the two spiral parts of the torsion spring 37 and simultaneously elastic force acts in a direction of closing each other.

The link 34 and the release link 35 are rotatably mounted in the case member 31 by that one end part of the rotation shaft part 34b of the link 34 is fitted to the bearing part 31c of the case member 31, and groove parts of the two-pronged portion of the engaging groove parts 34d, 34d are engaged with the engaging shaft 332 of the holding solenoid 33. At this time, the arm part 34c of the link 34 and the taper surface 35a of the release link 35 are mounted so as to expose downward from the open part in the lower side of the case member 31.

Then, another end part of the rotation shaft part 34b of the link 34 is inserted into an bearing part (not shown) formed in the inner wall part of the pin hole 32c of the cover member 32, and a pin 36 formed of a metal is inserted into the pin hole 32c so as to pass through the rotation shaft part 34b of the link 34. At the same time, the fitting projection parts 31e, 31d of the case member 31 were fitted to the fitting hole parts 32d, 32e of the cover member 32, and the engaging frame parts 32f of the cover member 32 is engaged with the engaging claws 31f of the case member 31, thereby the cover member 32 is mounted in the case member 31.

In this state, another end 37b of the torsion spring 37 remains projecting from the open part 32g of the cover member 32 to the outside. The another end 37b of the torsion spring 37 projecting to the outside is engaged with the spring engaging part 32h while twisted in the direction in which the spiral parts are closed, thereby elastic force of the torsion spring 37 acts on the link 34 and the release link 35 in the direction in which the spiral parts are opened via the combining part 37c. As a result, while the link 34 and the release link 35 are restrained by the holding solenoid 33 via the engaging groove parts 34d, 34d, parts of the arm part 34c exposed from the case member 31 and the taper surface 35a of the release link 35 provide elastic force downward.

Figure 5:
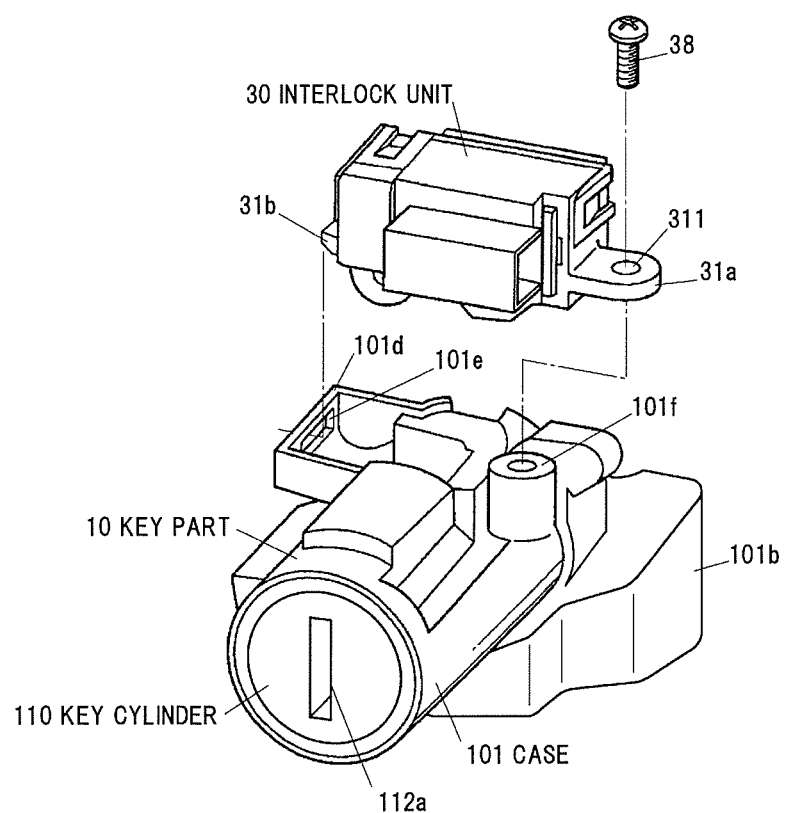
FIG. 5 is a perspective view schematically showing an installation method of an interlock unit as the key interlock device according to one embodiment of the present invention in the steering lock device.

FIG. 5 is a perspective view schematically showing an installation method of the interlock unit 30 as the key interlock device according to one embodiment of the present invention in the steering lock device 1. As shown in FIG. 5, in the steering lock device 1, a housing frame part 101d that houses the interlock unit 30 therein and a screw boss part 101f are integrally formed with the case 101 at the installing position of the interlock unit 30 in the backward upper part of the key part 10. In addition, an engaging hole 101e is formed in the left side wall of the housing frame part 101d so as to be opened.

The interlock unit 30 is mounted in the housing frame part 101d of the steering lock device 1 by that the engaging projection part 31b in the left side is inserted into the engaging hole 101e of the housing frame part 101d from the inside so as to be engaged with each other, and then a mounting screw 38 is inserted into the hole 311 of the screw bracket part 31a so as to be fastened to a screw hole of the screw boss part 101f.

Figure 6A:
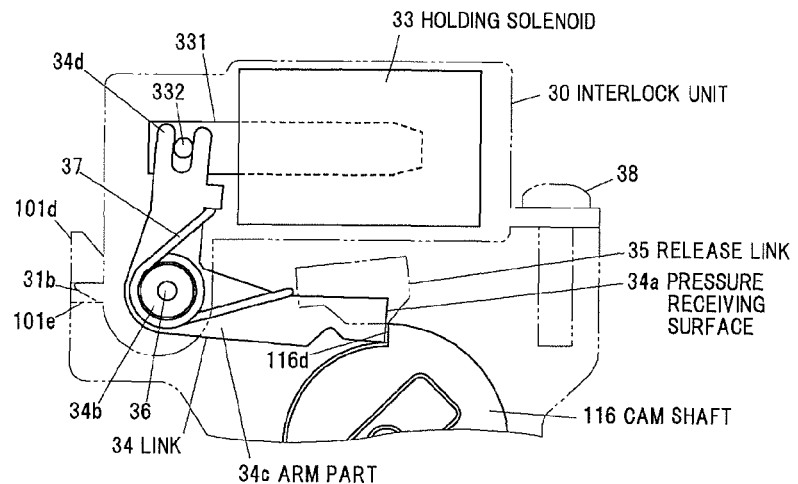
FIG. 6A is a front view schematically showing an inner structure of the interlock unit as the key interlock device according to one embodiment of the present invention, in which the interlock unit is in an interlock state.
Figure 6B:
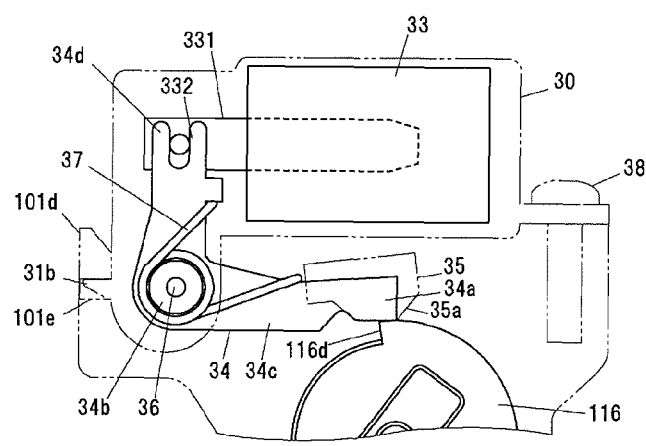
FIG. 6B is a front view schematically showing an inner structure of the interlock unit as the key interlock device according to one embodiment of the present invention, in which the interlock unit is in a state that the interlock state is released.

FIG. 6A is a front view schematically showing an inner structure of the interlock unit 30 as the key interlock device according to one embodiment of the present invention when viewed from the insertion direction of the key K, in which the interlock unit 30 is in an interlock state. Similarly, FIG. 6B is a front view schematically showing an inner structure of the interlock unit 30 as the key interlock device according to one embodiment of the present invention, in which the interlock unit 30 is in a state that the interlock state is released.

In case that a shift lever of a vehicle is operated to a shift position other than "P (parking)", driving current is supplied to the holding solenoid 33 from a control device (not shown). At this time, the holding solenoid 33 becomes in an excited state, thereby the position of the plunger 331 is held, and simultaneously the link 34 is restrained from being rotated via the engaging groove parts 34d engaging with the engaging shaft 332 (the interlock state).

As shown in FIG. 6A, the link 34 transmits a rotation restraining force generated by the holding solenoid 33 in an excited state to the cam shaft 116. In order to oppose against the rotation restraining force, the rotation shaft part 34b and the pin 36 of the link 34 are arranged on an extension of a line of force of the rotation operation force of the key K generated in the tangential direction of the cam shaft 116.

Namely, in case that the key K is operated so as to be returned from the "ACC" position to the "LOCK" position in the interlock state, the link 34 is restrained from being rotated by the holding solenoid 33, so that a state that an action surface 116d of the cam shaft 116 and the pressure receiving surface 34a of the arm part 34c of the link 34 are brought into contact with each other is maintained. Thereby, the rotation operation force by the key K is received at the rotation shaft part 34b and the pin 36 passing through the rotation shaft part 34b located on an extension of a line of force thereof, and simultaneously a rotation restraining force as the counteraction is transmitted to the cam shaft 116 via the link 34, so that the rotation operation of the key K in the direction returning to the "LOCK" position is locked.

As shown in FIG. 6B, in case that a shift lever of a vehicle is operated to a shift position of "P (parking)", the supply of driving current to the holding solenoid 33 is blocked, thereby the rotation restraint of the link 34 is released. Accordingly, when the key K is operated from the "ACC" position to the "LOCK" position in this state, the taper surface 35a of the release link 35 runs upon an edge of the action surface 116d of the cam shaft 116, thereby the arm part 34c of the link 34 on which elastic force acts toward the release link 35 by the torsion spring 37 is also rotated in conjunction therewith, thus the interlock state is released so that the rotation operation of the key K to the "LOCK" position is allowed.

As explained above, in accordance with the interlock unit 30 of the embodiment, the rotation shaft part 34b for rotatably supporting the link 34 and the pin 36 penetrating through the rotation shaft part 34b are disposed on a line of force of the rotation operation force generated in the tangential direction of the cam shaft 116 operated by the key K. The rotation operation force from the cam shaft 116 is received at the rotation shaft part 34b and the pin 36, thereby the burden of a load to the link 34 can be reduced. In addition, the arm part 34c of the link 34 is formed so as to have a shape extending linearly from the rotation shaft part 34b as a center, so that only compression load component acts on the arm part 34c without bending stress component. The link mechanism of the above-mentioned configuration is adopted as a reinforcement part of the holding solenoid 33, so that as a material of the link 34 and the like, a resin having high resistance to a compression load such as PBT can be used instead of metal, so that high production costs can be reduced.

In addition, according to the embodiment, such a structure is adopted, that the engaging projection part 31b is formed in one end part of the interlock unit 30, and the engaging projection part 31b is engaged with the housing frame part 101d of the steering lock device 1 so that the interlock unit 30 is mounted. Thereby, in comparison with a conventional case that two mounting bolts are fastened, the mounting process of the interlock unit 30 can be simplified so as to reduce the production costs.

In addition, according to the embodiment, such a structure is adopted, that the engaging projection part 31b that allows the interlock unit 30 to engage with the steering lock device 1 is formed in a side (the left side when viewed from the insertion direction of the key K) on which the rotation operation force acts, the rotation operation force being directed toward the direction in which the key K is returned to the "LOCK" position at the interlock state. By the above-mentioned structure for installing in the steering lock device 1, the rotation operation force from the cam shaft 116 can be received on the surface of the housing frame part 101d of the steering lock device 1 instead of a conventional shear direction to the mounting bolts, thereby backlash, loose and the like that occur in the mounting part of the interlock unit 30 can be prevented, so that sufficient performance quality can be maintained.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A key interlock device for a rotating key rotor, comprising:
    a solenoid that holds a plunger; and
    a link member that comprises a shaft round which the link member is rotatable, and engages with the plunger so as to transmit a restraining force opposing an operation force of a key inserted in the rotor when the solenoid is excited,
    wherein the shaft of the link member is disposed on a virtual line extending along a line of force of the operation force of the key generated in a tangential direction about a cam shaft mounted on the key rotor, and the axis of the shaft is parallel to the axis of rotation of the key rotor, and
    wherein the link member further comprises a linear arm part having a flat-shaped pressure receiving surface, said linear arm part extending between the shaft and an action surface of said cam shaft to which the operation force of the key applies and directed co-linearly along the line of force of the operation force of the key when said flat-shaped pressure receiving surface of the linear arm part engages with said action surface of said cam shaft.

2. The key interlock device according to claim 1, wherein the link member further comprises a resin.

3. A key interlock device for a rotating key rotor, comprising:
    a solenoid that holds a plunger; and
    a link member that comprises a shaft around which the link member is rotatable and engages with the plunger so as to transmit a restraining force opposing an operation force of a key inserted in the rotor when the solenoid is excited,
    wherein the shaft of the link member is disposed on a virtual line extending along a line of force of the operation force of the key generated in a tangential direction about a cam shaft mounted on the key rotor,
    wherein the key interlock device further comprises an engaging part through which the key interlock device is attached to a body of a steering lock device and which is disposed behind the shaft to which the operation force of the key applies, and the axis of the shaft is parallel to the axis of rotation of the key rotor, and
    wherein the link member further comprises a linear arm part having a flat-shaped pressure receiving surface, said linear arm part extending between the shaft and an action surface of said cam shaft to which the operation force of the key applies and directed co-linearly along the line of force of the operation force of the key when said flat-shaped pressure receiving surface of the linear arm part engages with said action surface of said cam shaft.

4. The key interlock device according to claim 3, wherein the link member further comprises a resin.

5. The key interlock device according to claim 3, wherein the engaging part is disposed at one end of the key interlock device and is adapted to be inserted into an opening of the body of the steering lock device, and the key interlock device is fixed to the body at another end thereof.

6. The key interlock device according to claim 3, wherein the engaging part is disposed at one end of the key interlock device in a direction of turning back the key from an ACC position to a LOCK position thereof.

7. The key interlock device according to claim 3, wherein the pressure receiving surface contacts the action surface to restrain the key from being turned back from an ACC position to a LOCK position thereof when the solenoid is excited.

8. The key interlock device according to claim 1, wherein the action surface is substantially flat and substantially orthogonal to the axis of the linear arm part.

9. The key interlock device according to claim 3, wherein the action surface is substantially flat and substantially orthogonal to the axis of the linear arm part.

10. The key interlock device according to claim 1, wherein the axial alignment between the linear arm part and the applied operation force of the key results in only a compression load component acting on the arm part without a bending stress component.

11. The key interlock device according to claim 3, wherein the axial alignment between the linear arm part and the applied operation force of the key results in only a compression load component acting on the arm part without a bending stress component.

* * * * *